United States Patent [19]
Nezu et al.

[11] Patent Number: 5,217,247
[45] Date of Patent: Jun. 8, 1993

[54] SUSPENSION CONTROL SYSTEM

[75] Inventors: Takashi Nezu, Tokyo; Masaaki Uchiyama, Kanagawa, both of Japan

[73] Assignee: Tokico Ltd., Kanagawa, Japan

[21] Appl. No.: 779,502

[22] Filed: Oct. 18, 1991

[30] Foreign Application Priority Data

Oct. 19, 1990 [JP] Japan .................................. 2-281565

[51] Int. Cl.$^5$ ............................................ B60G 11/26
[52] U.S. Cl. ................................................ 280/707
[58] Field of Search ............... 280/707, 708, 709, 710; 180/41; 188/299

[56] References Cited

FOREIGN PATENT DOCUMENTS

| 0427409 | 5/1991 | European Pat. Off. . |
| 63-9534 | 1/1988 | Japan . |
| 64-16409 | 1/1989 | Japan . |
| 0016410 | 1/1989 | Japan .................. 280/707 |
| 0016411 | 1/1989 | Japan .................. 280/707 |
| 0032916 | 2/1991 | Japan .................. 280/707 |
| 1150521 | 4/1969 | United Kingdom . |
| 1536795 | 12/1978 | United Kingdom . |
| 2221878 | 2/1990 | United Kingdom . |

Primary Examiner—Tamara L. Graysay
Attorney, Agent, or Firm—Wenderoth, Lind & Ponack

[57] ABSTRACT

A suspension control system for controlling the attitude of a vehicle such as an automobile includes a suspension unit including a hydraulic cylinder disposed between an axle and the body of the vehicle and an accumulator connected to the hydraulic cylinder, a pressurized hydraulic fluid source, a hydraulic fluid supplying and discharging valve operatively connected to the suspension unit and to the hydraulic fluid source and a controller for controlling the hydraulic fluid supplying and discharging valve to supply or discharge hydraulic fluid to or from the suspension unit. The suspension control system further includes a pressure sensor for detecting the pressure in the suspension unit. The controller also prevents hydraulic fluid from being discharged from the suspension unit when the pressure in the suspension unit is lower than a predetermined value.

2 Claims, 6 Drawing Sheets

SUSPENSION CONTROL SYSTEM

BACKGROUND OF THE INVENTION

1. Field of the Invention

The present invention relates to a suspension control system for controlling the attitude of a vehicle such as an automobile.

2. Prior Art

Recently, there has been proposed with an attempt at a practical application, a so-called active suspension system in which control is carried out to counter changes in the attitude of a vehicle which would otherwise occur during cornering, accelerating, braking and so on. A control operation, which is carried out on the basis of signals from vehicle height sensors, a speed sensor, a steering angle sensor, an acceleration sensor and the like, regulates an amount of hydraulic fluid to be supplied to or discharged from suspension units, each disposed between an axle and the vehicle body, to suppress changes in the attitude of the vehicle and thereby stabilize attitude of the vehicle. One example of such an active suspension system is disclosed in Japanese Patent Application Laid Open No. 16409/89.

FIG. 1 shows one example of a prior art active suspension control system. A suspension control system 1 comprises hydraulic cylinders 3a, 3b, 3c and 3d (reference numeral "3" will be used as a general reference numeral thereof hereinafter) mounted on a vehicle body (not shown). Respective piston rods 4a, 4b, 4c and 4d (general reference numeral "4") of the hydraulic cylinders 3 are connected to axles of wheels 2a, 2b, 2c and 2d (general reference numeral "2"), respectively. Accumulators 5a, 5b, 5c and 5d (general reference numeral "5") are connected to the respective cylinders 3. Each pairing of cylinders 3 and accumulators 5 constitutes a suspension unit. The hydraulic cylinders 3 are connected to a pressurized hydraulic fluid source 6 through hydraulic fluid supplying and discharging means 7a, 7b, 7c and 7d (general reference numeral "7"), respectively. Each hydraulic fluid supplying and discharging means 7 comprises an electromagnetic switching valve or a proportional valve which is adapted to be controlled by means of a controller 11 which will be described hereinafter. When electromagnetic switching valves are used as hydraulic fluid supplying and discharging means 7, desired amounts of fluid are supplied to and discharged from the respective cylinders 3 by controlling the periods of time during which the valves are opened. When proportional valves are used, desired amounts of fluid are supplied to and discharged from the respective cylinders 3 by controlling the openings of the valves.

Shown at 10a, 10b, 10c and 10d (general reference numeral "10") are height sensors for measuring the height of the vehicle based on the state of the cylinders 3. Reference numerals 12 and 13 respectively designate a steering angle sensor for detecting the steering angle based on the degree of rotation of the steering wheel and a vehicle speed sensor for detecting the speed of the vehicle. Signals from the sensors 10, 12 and 13 are input to the controller 11. The controller predicts changes in the attitude of the vehicle which would otherwise occur, and controls the hydraulic fluid supplying and discharging means 7 to control the amounts of fluid to be supplied to and discharged from the respective cylinders.

The accumulators 5 are of a gas-sealed-in type, as shown in FIG. 2. In the figure, reference numeral 14 designates a tubular housing with a closed bottom end. Opposite open end of the housing 14 is closed by means of a closure member 15. A piston 18 is slidably disposed in the housing 14 to divide the interior of the housing 14 into a gas chamber 16 and a oil chamber 17. A gas, for example, nitrogen gas is sealed in the gas chamber 16, while the oil chamber 17 communicates with the cylinder 3 through a passage 15a so that the same hydraulic fluid is also introduced into and discharged from the oil chamber 17 when hydraulic fluid is supplied to and discharged from the corresponding cylinder 3 by means of the hydraulic fluid supplying and discharging means. The piston 18 is provided with a sealing member 19 mounted thereon for creating a seal between the gas chamber 16 and oil chamber 17. The piston 18 moves in the housing 14 in response to the supply and discharge control of the hydraulic fluid into and from the suspension unit to provide the suspension unit with spring characteristics.

However, the conventional suspension control system as mentioned above suffers from the following problems.

When a vehicle is running on a rough road, when accelerating while cornering, or when a steering operation is continuously carried out to increase a cornering angle, the height of the vehicle greatly changes. As a result, a great amount of hydraulic fluid is discharged from suspension units and the piston 18 is displaced, thereby contacting the closure member 15. This is called a zero-down state. The zero-down state is accompanied by a harsh noise. Further, the pressure level of the hydraulic fluid in the suspension unit changes suddenly, thereby creating an oil hammer effect, which may result in a deterioration in the durability of hydraulic apparatus such as the cylinders 3, valves of the supplying and discharging means 7 and so on, and thus cause a decrease in driving stability.

In some cases, an annular buffer 20 is mounted on the inner surface of the closure member 15, as shown in FIG. 2, in order to suppress noise. However, it is difficult to suppress the noise over a long period of time due to aging of the buffer.

Further, even if the buffer 20 serves to suppress noise, the arrangement does not serve to eliminate substantial and sudden changes in the pressure level of the hydraulic fluid in the suspension unit. Accordingly, problems of the deterioration of the hydraulic apparatus and of the lowering of the driving stability remain unsolved.

SUMMARY OF THE INVENTION

It is a primary object of the present invention to provide a suspension control system which prevents the so-called zero-down phenomenon, thereby preventing the occurrence of noise, deterioration of hydraulic apparatus and a reduction in driving stability.

In order to accomplish the above-mentioned object, the present invention provides a suspension control system for controlling the attitude of a vehicle, such as an automobile, comprising a suspension unit including a hydraulic cylinder disposed between an axle and the body of the vehicle and an accumulator connected to the hydraulic cylinder, the accumulator being designed to serve as a spring element, a source of pressurized hydraulic fluid, a hydraulic fluid supplying and discharging means connected to the suspension unit and the pressurized hydraulic fluid source, and a control means for controlling the hydraulic fluid supplying and discharging means to supply and discharge hydraulic fluid to and from the suspension unit. The suspension control system further comprises a pressure sensor means for detecting a pressure level of hydraulic fluid in the suspension unit. The control means includes a fluid discharge prevention means for preventing the discharge of hydraulic fluid from the suspension unit when the pressure level of hydraulic fluid in the suspension unit is lower than a predetermined level.

The above and other objects and features of the present invention will become more apparent from a consideration of the following description in conjunction with the accompanying drawings.

DETAILED DESCRIPTION OF THE PREFERRED EMBODIMENT

Figure 1:
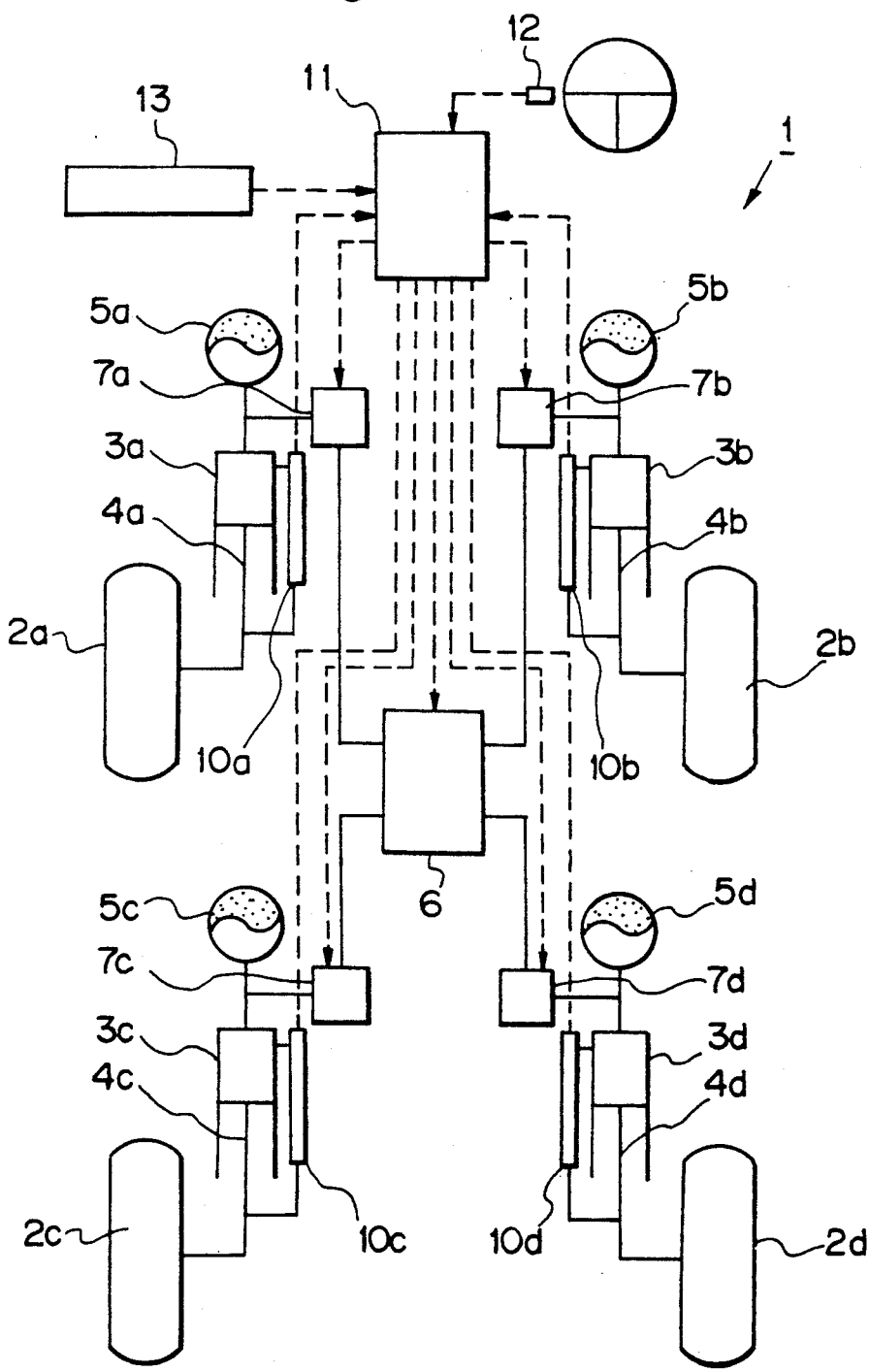
FIG. 1 is a schematic view of a conventional suspension control system.
Figure 3:
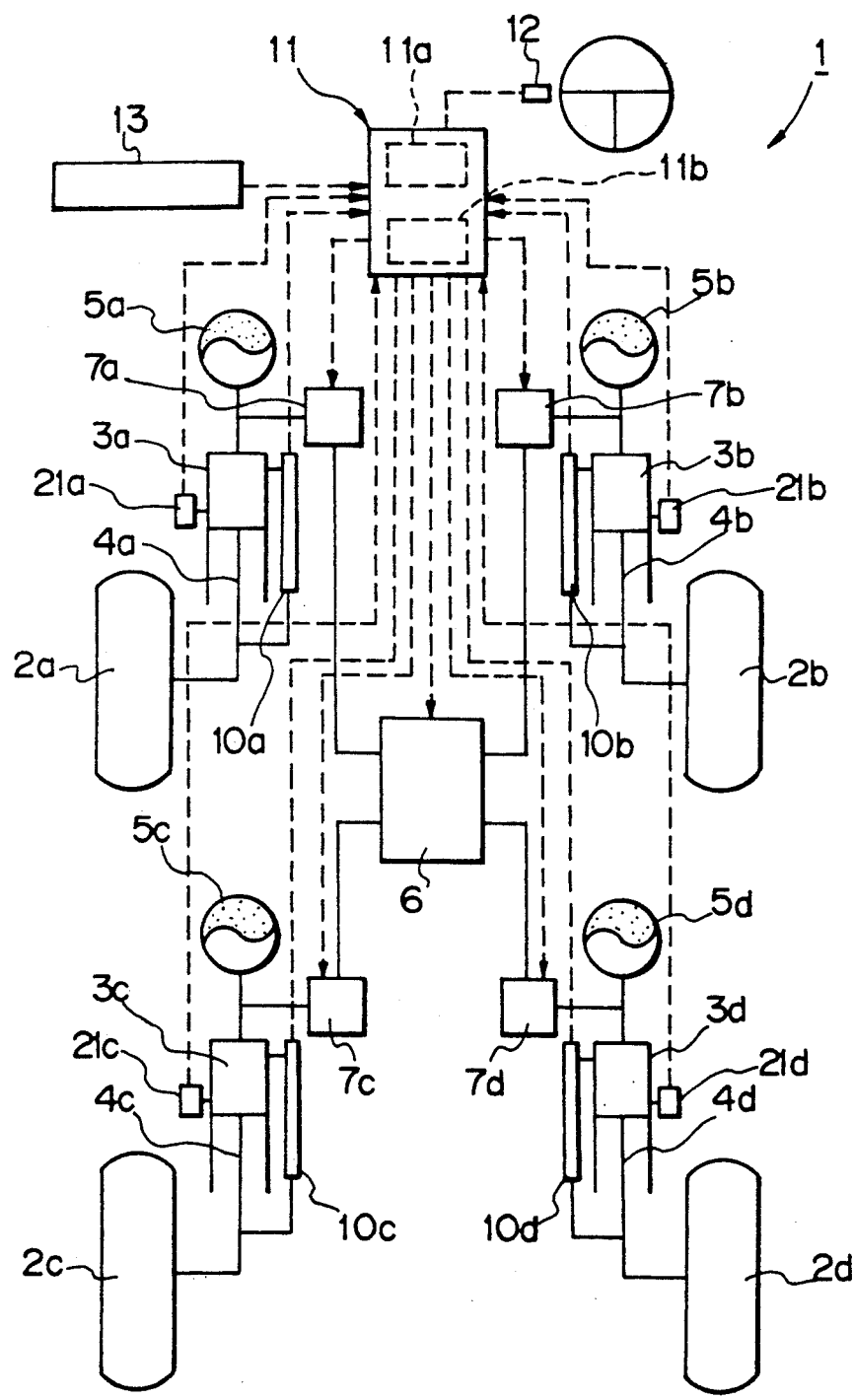
FIG. 3 is a schematic view of a suspension control system of the present invention.

FIG. 3 is a schematic view of a preferred embodiment of a suspension control system according to the present invention. In the figure, the same reference numerals will be given to the same elements as those of the conventional suspension control system shown in FIG. 1 and a detailed explanation thereof will be omitted.

Figure 2:
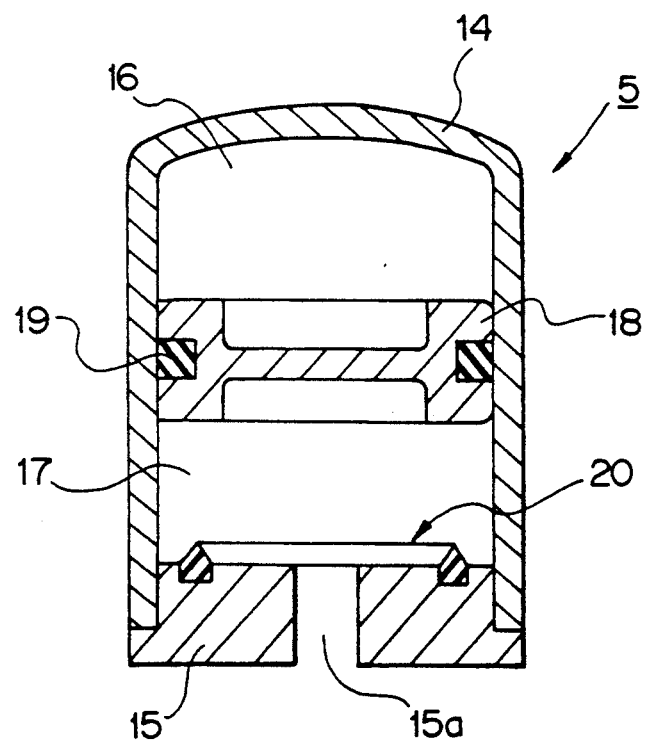
FIG. 2 is a sectional view of an accumulator of the conventional suspension control system shown in FIG. 1.

In the preferred embodiment, cylinders 3a, 3b, 3c and 3d are provided with pressure sensors 21a, 21b, 21c and 21d, respectively, for detecting the pressure therein. Each pressure sensor 21 is connected to a controller 11. The controller 11 includes a supply-discharge control means 11a which, in the same manner as in the conventional suspension control system explained hereinbefore, predicts changes in the attitude of a vehicle, on which the present system is mounted, which would otherwise occur. These changes are predicted on the basis of signals from height sensors 10, steering angle sensor 12 and speed sensor 13, and this controller controls hydraulic fluid supplying and discharging means 7 to regulate the amounts of hydraulic fluid to be supplied to and discharged from the respective suspension units. The controller 11 further includes a discharge prohibition means 11b for outputting signals to the hydraulic fluid supplying and discharging means 7 for preventing the discharge of hydraulic fluid from the corresponding suspension unit when the pressure in the corresponding suspension unit is lower than a predetermined pressure level or threshold value Pth. Accumulators 5 are of the gas-sealed-in type of the conventional accumulator shown in FIG. 2 except that the buffer 20 is omitted.

The threshold value is determined as follows.

Figure 4:
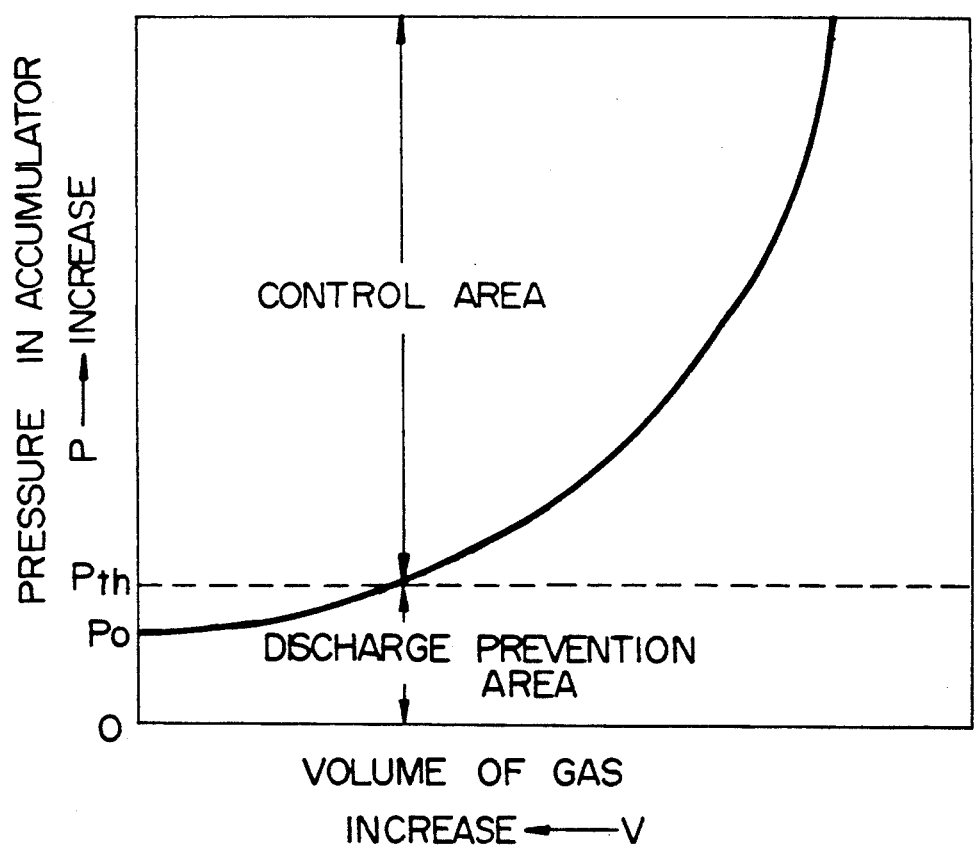
FIG. 4 is a graph showing changes in an accumulator of the suspension control system shown in FIG. 3.

Nitrogen gas is sealed in the accumulator 5. The amount of gas to be sealed therein is selected such that the zero-down pressure, namely, the pressure of the gas when a zero-down state occurs becomes a predetermined pressure $P_o$. The pressure P of the gas in the accumulator 5 increases along a quadratic curve as the volume of the gas decreases as shown in FIG. 4. In the present invention, the threshold value Pth is set to be slightly higher than the zero-down pressure $P_o$. As a result, when the pressure P in an accumulator 5 falls below the threshold value Pth, the discharge prevention means 11b controls corresponding hydraulic fluid supplying and discharging means 7 to stop the discharge of hydraulic fluid from the suspension unit, thereby preventing the occurrence of a zero-down state. In this connection, it is to be noted that the threshold value Pth is selected such that the occurrence of a zero-down state can be prevented even when the height of the vehicle is further greatly changed due to driving in a dip in the road or to accelerating while cornerning.

Figure 5:
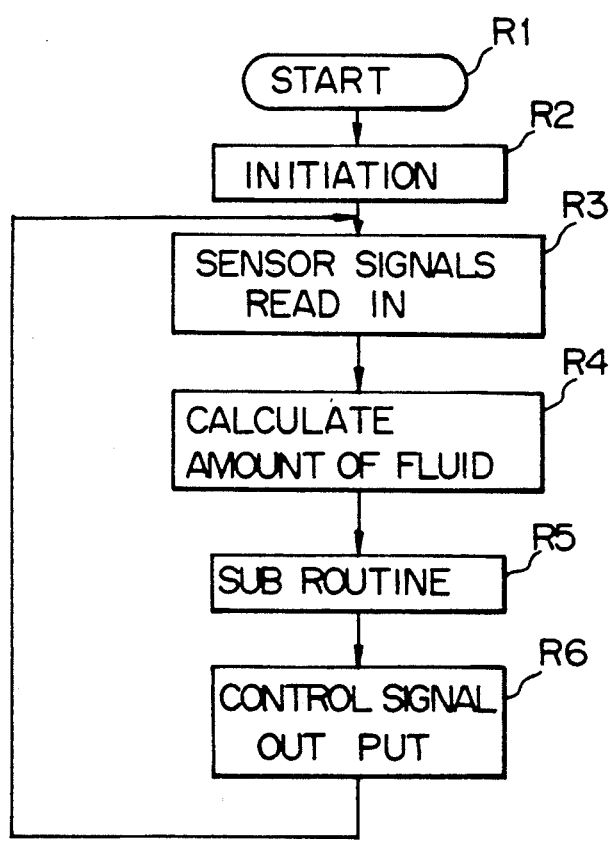
FIGS. 5 and 6 are flow charts of a control means of the suspension control system shown in FIG. 3.
Figure 6:
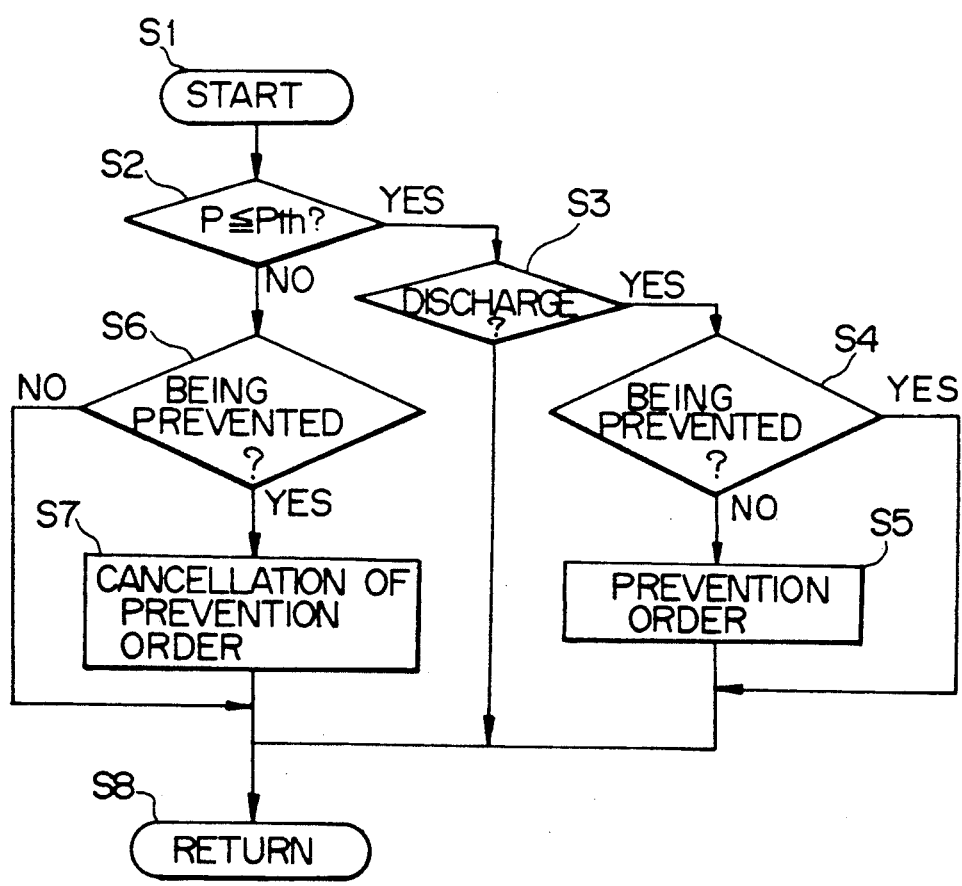

Referring to FIGS. 5 and 6, the operation of the present system will be explained.

FIG. 5 shows a main program for the controller 11.

At step $R_1$, the power is on and the operation starts. At step $R_2$, the program is initiated. At step $R_3$, signals from the sensors 10, 12 and 13 are read into the controller 11 after an A/D conversion operation is carried out. At step $R_4$, the controller 11 calculates the amounts of hydraulic fluid to be supplied to or to be discharged from the respective suspension units. At step $R_5$, the sub-routine program shown in FIG. 6 is carried out. At step $R_6$, the results obtained at steps $R_4$ and $R_5$ are outputted to associated ports, subjected to a D/A conversion operation, and issued to the respective supplying and discharging control means 7 through amplifiers as control signals. The main program is carried out at predetermined time intervals.

FIG. 6 shows the subroutine carried out by the fluid discharge prevention means 11b. At $S_2$, the controller 11 judges whether the pressure P in each suspension unit detected by the corresponding pressure sensor 21 is lower than the threshold value Pth. When the pressure P is lower than the threshold value Pth, the operation advances to step $S_3$. At step $S_3$, the controller judges whether the amount of fluid calculated at step $R_4$ should be supplied to the suspension unit or discharged from the suspension unit. When fluid should be supplied to the suspension unit, the operation advances to step $S_8$, whereby the operation returns to the main program. When the amount of fluid calculated at step $R_4$ is judged to be excessive so that fluid should be discharged from the suspension unit, the operation advances to step $S_4$, where the controller judges whether fluid discharge from the suspension unit is being prevented. When the fluid discharge is not being prevented, the discharge prevention means 11b outputs a discharge prevention signal and then the operation returns to the main program via step $S_8$. When the fluid discharge is being prevented, the operation directly advances to step $S_8$ and then returns to the main program.

When the pressure in the suspension unit is judged to be higher than the threshold value Pth at step $S_2$, the operation advances to $S_6$, where the controller judges whether the discharge prevention order has been cancelled. When the order has not been cancelled, the operation advances to step $S_7$, where the controller cancels the discharge prevention order and then the program returns to the main program via step $S_8$. When the prevention order has already been cancelled, the operation directly advances to step $S_8$ and then returns to the main program.

Although accumulators 5 of a gas-sealed in type are used in the embodiment described above, other types of accumulators, for example, those of a mechanical spring type, may be employed. Further, those of a gas-sealed-in type and of a mechanical spring type may be used together. Although the controller 11 of the present embodiment is designed to control the discharge prevention and cancellation operation on the basis of only the relationship between the actual pressure P in the suspension units and the predetermined threshold value Pth, the controller may be designed to stop the control of discharge prevention and cancellation when the pressure in the suspension unit changes with a high frequency, since repetition with too high of a frequency of fluid discharge prevention operation and cancellation thereof is undesirable in the control system. Further, the threshold value Pth may be reset at a higher level as the temperature in the accumulator increases.

What is claimed is:

1. A suspension control system for controlling the attitude of an automotive vehicle, said system comprising:

a suspension unit including a hydraulic cylinder disposed between an axle and the body of the vehicle and an accumulator connected to said hydraulic cylinder, said accumulator including a housing, a movable member movable within said housing and partitioning said housing into a gas chamber, and gas under pressure in said gas chamber, said movable member being in operative hydraulic communication with said suspension unit so as to undergo movement in correspondence with changes in the pressure of the hydraulic fluid in the suspension unit thereby varying the volume of said gas chamber whereby said accumulator acts as a spring;

a source of pressurized hydraulic fluid;

hydraulic fluid supplying and discharging means operatively hydraulically connected to said suspension unit and to said pressurized hydraulic fluid source for selectively supplying said suspension unit with hydraulic fluid from said source and discharging hydraulic fluid from said suspension unit;

pressure sensor means for detecting the pressure of the hydraulic fluid in the suspension unit; and control means operatively connected to said hydraulic fluid supplying and discharge means and to said pressure sensor means for controlling said hydraulic fluid supplying and discharging means to supply or discharge hydraulic fluid to or from said suspension unit and to prevent hydraulic fluid from being discharged from the suspension unit when the pressure of hydraulic fluid in said suspension unit is lower than a predetermined level that is slightly higher than the pressure of said gas in said gas chamber when said gas chamber has a maximum allowable volume.

2. A suspension control system according to claim 1, wherein the housing of said accumulator has a closed bottom end and an open end, said movable member is a piston slidably disposed in the housing to define said gas chamber with said housing, a closure member covers the open end of the housing, and said predetermined level is higher than the zero-down pressure of said accumulator at which the gas causes said piston to abut said closure member.

* * * * *